United States Patent Office 3,080,217
Patented Mar. 5, 1963

3,080,217
METHOD OF DISSOLVING IODINE IN WATER
Thomas E. Myers, Box 560, Rte. 1, Bittersweet Drive, St. Charles, Ill.
No Drawing. Filed Aug. 29, 1960, Ser. No. 52,362
3 Claims. (Cl. 23—309)

This invention relates to a method of dissolving materials, and particularly iodine, in water without relying upon other chemicals present to effect such dissolution.

In general the method includes the placing of iodine or other material in a body of distilled water, then placing the material and water in a strong magnetic field of greater strength than the earth's magnetic field. It has been found that under such conditions the materials go rapidly into solution even though they are materials that are normally extremely difficult to dissolve in water in any appreciable amounts, particularly in the case of iodine, which has a very low solubility in clear water, the results are indeed surprising. The iodine billows into solution very rapidly and to a much higher concentration than can be achieved without placing the materials in a magnetic field.

It is therefore an object of this invention to provide a method of dissolving materials, and particularly iodine, in water in greater concentration than is possible by other known methods.

Another object of this invention is to provide a method of dissolving material, and particularly iodine, in water without using any other chemical materials.

Still another object of the invention is to provide a method of dissolving materials, and particularly iodine, in water and wherein the speed of dissolution of the material may be controlled and dissolution may be abruptly terminated when desired.

Other objects and advantages will become apparent to those skilled in the art as the description proceeds.

Applicant has found that pure iodine, either in crystalline or vapor form, can be made to dissolve in pure water more readily and to a greater concentration when subjected to a fairly strong magnetic field. In tests applicant employed Alnico magnets of approximately 6,000 gausses and 12,000 gausses. The pole pieces were constructed to give a concentrated undistorted flux running perpendicularly through the test liquid. In one case crystalline iodine was place in a container of distilled water and the latter placed in the aforesaid field with an adjustable pole piece that could be brought into contact with the liquid or placed slightly thereabove. Upon entering the magnetic field the iodine immediately began disassociating into a deep red and almost violet cloud which soon permeated the whole body of water. The entire process was performed in a static magnetic field and in the complete absence of any electric field.

The resulting product was a highly concentrated solution of iodine dissolved in pure water.

In another test a wire-wound electromagnet was used instead of permanent magnets and it was found that, when energized by a 6-volt battery, rapid dissolution of the iodine was produced. When the electromagnet was energized from a 12-volt supply, the iodine dissolved much more rapidly, thus indicating that the speed and probably ultimate concentration of the solution is greater for greater field strengths. Applicant's tests indicate that the longer the materials are left in the magnetic field the greater the concentration of the solution.

In other tests, crystalline iodine was heated in a flask and the vapors therefrom were conducted through tubing into a body of distilled water placed in the magnetic field. It was found that even the iodine vapors dissolved immediately in the water to form a highly concentrated and very dark-colored solution.

Samples of this iodine solution in distilled water were permitted to stand quiescent for several weeks and were then placed in a high-speed centrifuge. Not a single particle of sediment or separation was found, which indicates that a true solution was produced. Chemical tests indicate that only pure iodine was in solution in the water.

Such an aqueous solution of iodine was found to be highly active as an oxidizer and constitutes a very active reagent. It is also believed that the solution has germicidal and other antiseptic properties. Some .021 N solution was applied by applicant to a wart and within a week its size had been reduced approximately one half. Applicant has also tested approximately 100 other materials, which were materials difficult to dissolve in water, and found that the rate and extent of dissolution of each was increased when placed in a magnetic field as described. An iodine solution produced in the manner described herein does not smart or sting when applied to an open cut or wound.

I claim:
1. The method of accelerating dissolution of iodine in water, comprising the steps of; placing iodine in a body of water, and placing said iodine water in a magnetic field of materially greater field strength than the earth's magnetic field and with said field extending perpendicularly through said body of water whereby said iodine rapidly dissolves in said water, and removing said magnetic field from said body when the desired quantity of iodine has been dissolved.
2. The method defined in claim 1 wherein said iodine is placed in said water in crystalline form.
3. The method defined in claim 1 wherein said iodine is placed in said water in the form of iodine vapor.

References Cited in the file of this patent

UNITED STATES PATENTS 2,089,966   Kassner _____ Aug. 17, 1937

FOREIGN PATENTS 293,504   Great Britain _____ July 12, 1928